UNITED STATES PATENT OFFICE.

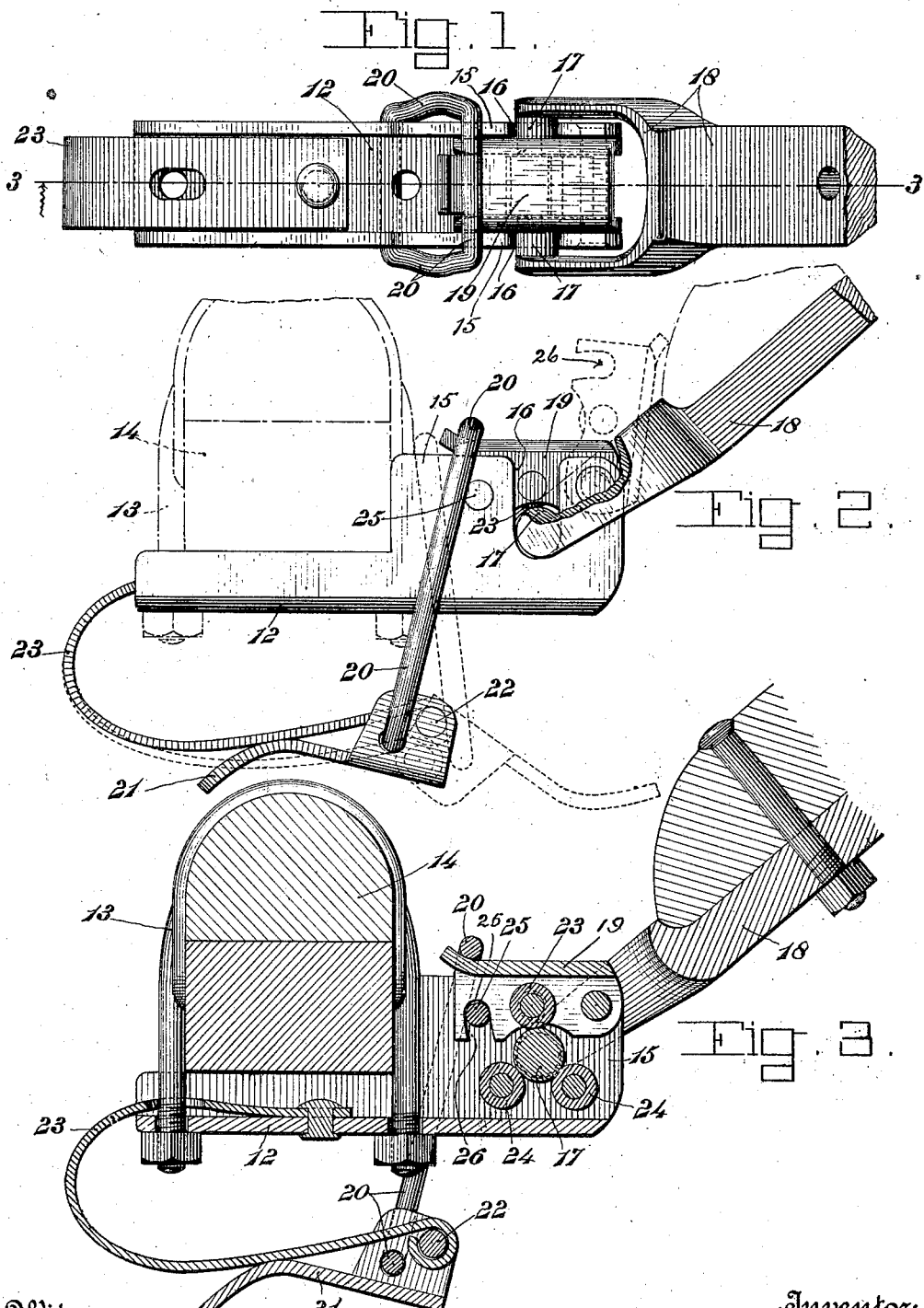

AUGUSTUS G. SNYDER, OF UTICA, NEW YORK.

THILL-COUPLING.

1,029,896.   Specification of Letters Patent.   Patented June 18, 1912.

Application filed January 16, 1912. Serial No. 671,508.

*To all whom it may concern:*

Be it known that I, AUGUSTUS G. SNYDER, a citizen of the United States, residing at Utica, in the county of Oneida and State of New York, have invented or discovered certain new and useful Improvements in Thill-Couplings, of which the following is a specification, reference being had therein to the accompanying drawings.

This invention relates to an anti-rattling thill coupling, and has for its object to provide a coupling of the class referred to, in which the bearing-pin of the thill iron is yieldingly but firmly held in place between anti-friction rollers which permit the said pin to be grasped with considerable firmness, so as to prevent rattling, without causing it to bind objectionably.

In the drawings Figure 1 is a plan view of the improved coupling. Fig. 2 is a side view thereof, and Fig. 3 is a longitudinal section of the same.

Referring to the drawings, 12 denotes the draft-bar which is adapted to be secured by a suitable clip, as 13, to the front axle 14 of a vehicle. The said draft-bar preferably comprises flanges 15 each of which is provided with an open-topped notch 16 for the reception of the cross bar or draft-pin 17 of the thill-iron 18. The notches 16 provide an open-topped recess in the fixed jaw portion of the draft-bar. Pivoted to the front ends of the flanges 15 is a swinging latch or jaw 19 normally closing the top of said recess and having a slightly upturned portion at its free end for engagement with a link or bail 20 the lower end of which is attached to a lever 21 pivotally secured, by means of a pin 22, to the front end of a spring 23 which is riveted or otherwise permanently attached to the draft bar 12. By virtue of this construction, in which the link or bail 20 is connected to the lever 21 eccentric to the pivot or fulcrum of said lever, the pivoted latch or jaw 19 may be properly retained in its working position, or may be readily released for the insertion or removal of the draft pin or cross-bar of the thill iron when swung upward as denoted by dotted lines in Fig. 2.

Mounted in the pivoted latch or jaw 19, between side flanges with which said latch is provided, is an anti-friction roller 23, and mounted between the flanges 15 of the draft-bar 12 are two other anti-friction rollers 24 which are so disposed, adjacent to the open-topped recess afforded by the notches 16, that the pin or cross-bar 17 of the thill-iron may rest thereon, while the roller 23, carried by the swinging latch or jaw 19, will bear upon the top of the said pin or cross-bar, thereby permitting the latter to be clamped between the said anti-friction rollers in such a manner that it will be held in place with considerable firmness, to prevent rattling, but will still be free to move with the proper freedom without causing too much friction, such as would cause objectionable stiffness or would result in objectionable wear.

The anti-friction rollers 23 and 24 are preferably of hardened steel, and the cross-bar or pin of the thill-iron may likewise be of hardened metal, if desired. Between the flanges 15 extends a bracing or stiffening pin 25 which, when the swinging latch or jaw 19 is in working position, is received in notches 26 in said latch, the said pin thus also serving to steady the said swinging latch or jaw.

From the foregoing it will be understood that the invention provides an anti-rattling thill coupling of convenient construction and efficient operation, as well as a coupling which will be very durable, in that objectionable wear of the parts is avoided.

Having thus described my invention I claim and desire to secure by Letters Patent:

In a thill coupling, the combination with a draft iron having a fixed jaw or part comprising side flanges having open-topped notches and provided with anti-friction bearing rollers arranged between said flanges adjacent said notches, of a thill iron having a pin or cross bar adapted to be received in said notches, and to bear against said rollers, a swinging latch or jaw provided with an anti-friction roller bearing against the upper side of said cross bar or pin and having side flanges between which said last-named roller is mounted, and yielding means for securing said swinging latch or jaw in place.

In testimony whereof I affix my signature, in presence of two witnesses.

AUGUSTUS G. SNYDER.

Witnesses:
M. L. ROWE,
J. H. BURKE.

---

Copies of this patent may be obtained for five cents each, by addressing the "Commissioner of Patents, Washington, D. C."